Figure 1:
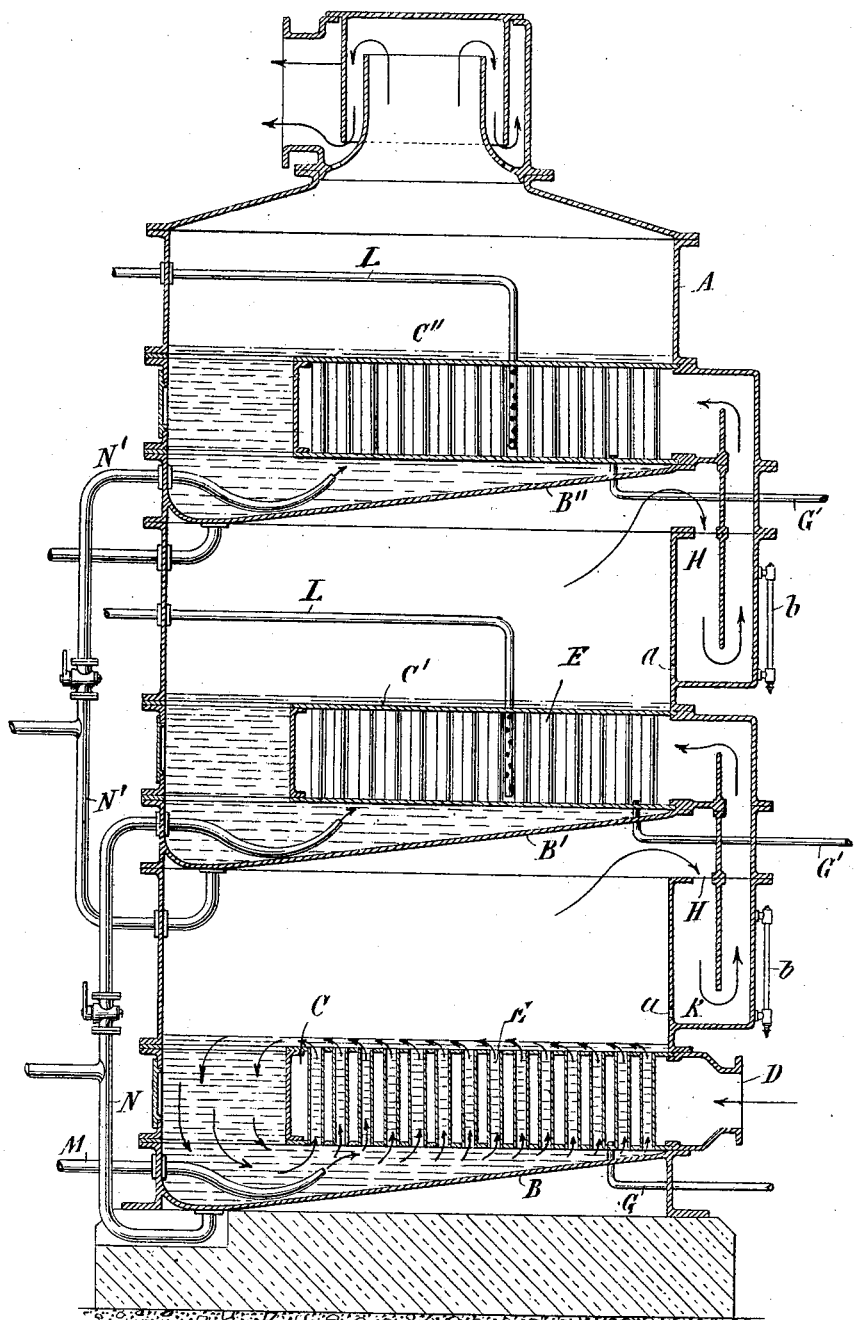

No. 643,794. Patented Feb. 20, 1900.
R. HARVEY.
VACUUM PAN.
(Application filed Apr. 15, 1899.)
(No Model.) 2 Sheets—Sheet 1.

Witnesses: Raphaël Netter, M. Lamson Dyer

Inventor: Robert Harvey
by Kerr, Page & Cooper, Att'ys

No. 643,794. Patented Feb. 20, 1900.
R. HARVEY.
VACUUM PAN.
(Application filed Apr. 15, 1899.)
(No Model.) 2 Sheets—Sheet 2.

UNITED STATES PATENT OFFICE.

ROBERT HARVEY, OF GLASGOW, SCOTLAND.

VACUUM-PAN.

SPECIFICATION forming part of Letters Patent No. 643,794, dated February 20, 1900.

Application filed April 15, 1899. Serial No. 713,165. (No model.)

*To all whom it may concern:*

Be it known that I, ROBERT HARVEY, a subject of the Queen of Great Britain, residing at Glasgow, in the county of Lanark, Scotland, have invented certain new and useful Improvements in Apparatus for Evaporating Liquids, of which the following is a specification, reference being had to the drawings accompanying and forming a part of the same.

The invention which forms the subject of this application for Letters Patent is an improvement in apparatus for evaporating and concentrating liquids, and has for its object to produce a means whereby this operation may be carried out more easily and economically than by the devices heretofore used.

The invention involves as its chief features of novelty an improved form of evaporator-pan and an improved arrangement or combination of two or more of such pans by means of which the vapors driven off from one are utilized and applied for carrying on the process of evaporation in another.

The invention also includes certain novel features of construction, which will be more fully hereinafter described.

The nature of my improved evaporating-pans will be understood from the following general description.

The pan is deeper at one end or side than at the other and contains a steam-drum with a number of vertical passages or tubes which permit of a free circulation of the liquid through them. These parts are so arranged that when a proper quantity of liquid is run into the pan and steam introduced into the latter the liquid as it is heated in the vertical tubular passages through the drum will rise and flow over the top of the drum into the deeper portion of the pan, thus maintaining a free circulation of all the liquid in the pan so long as heat is applied. I arrange two or more of said pans in a vertical series, inclosing each pan in a suitable receptacle or chamber. The drum of the first pan of the series is to be connected with a steam-supply, which boils the liquid in the pan and is drawn off as it condenses. The vapor given off from the boiling liquid is conducted into the drum of the next pan of the series, in which it is condensed, thus maintaining a partial vacuum in the first pan. The liquid in the second pan, which is drawn from the partially-evaporated liquid in the first, is again boiled, and the vapors driven off therefrom are conducted into and condensed in the drum of the third pan of the series. The liquid in this latter is drawn from the second pan, and the space above the pan is directly connected with a vacuum-pump. By this arrangement the liquid is boiled in each pan of the series, the heavier liquid from one being drawn off into the next, fresh liquid being supplied to the first pan, and the evaporated or concentrated liquid being drawn off from the last of the series.

The details of construction and other minor improvements in the apparatus will be described by reference to the drawings hereto annexed, in which—

Figure 2:
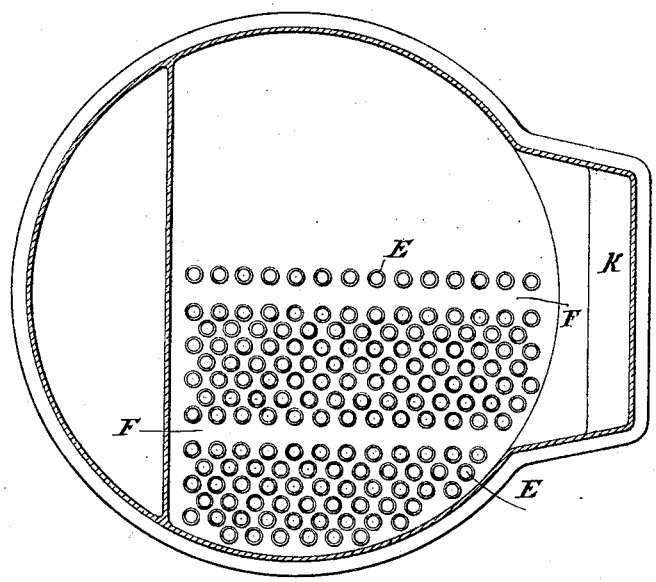

Figure 1 is a central vertical section of the apparatus, and Fig. 2 a horizontal cross-section through one of the upper pans and drums.

A designates a structure comprising three evaporating-pans B B' B'', arranged in a vertical series and connected for operation and use as above indicated. It will be understood that I may use only two of such pans or a greater number than three; but in the description of my invention I shall confine myself to illustrating only that arrangement and construction which I prefer for practical purposes.

The construction of the apparatus may be varied; but I prefer to build it up of plates, separable according to well-understood plans, so that in case of need the dimensions of the apparatus may be increased.

In the lower section of the cylindrical structure A is a pan B, deeper at one end than at the other. Extending horizontally into this pan and occupying approximately three-fourths of its area is a closed steam drum or chamber C, with an inlet D, which latter is designed for connection with a steam-boiler or the exhaust of an engine. The drum C contains a number of vertical passages E, formed by tubes open to the pan above and below, and in order that the steam may have ready access to the farther end of the drum I leave out rows of the tubes at intervals, as shown in Fig. 2, to form free passages F, through which the steam may pass with less tendency to condensation. The water of condensation is drawn off from the drum C by a pipe G.

The construction of the second and third pans B' and B'' is similar to that of the pan B except in the following particulars: The pan B is entirely inclosed; but a passage H connects its chamber with the interior of the drum C'. The said passage contains a trap K, in which the water of condensation or any liquid that may go over from the pan is collected. A gage $b$ may be employed to show the level of any liquid that may collect in the trap, in order that it may be withdrawn, or a small opening $a$ may be provided to permit it to run back into the pan.

To dispose of the water of condensation in the drum C', a drip-pipe G' is provided, which is preferably connected with an exhaust or vacuum pump. I provide also a pipe L, preferably perforated, as shown in the drawings, which enters the drum C' and is connected with the vacuum-pump, and by means of which any air or gas which may accumulate in the drum and by impairing the vacuum therein prevent the proper operation of the apparatus may be periodically withdrawn.

The pan B'' and drum C'', with their appurtenances, are in all respects similar to those just described. The space above the pan B'', however, connects directly with the vacuum-pump, so that a vacuum of about twenty-eight inches may be normally maintained in the space above the pan.

The passages E between the drums are of the form shown in Fig. 2—that is to say, instead of being simple pipes they extend over a considerable arc and have a comparatively-large sectional area. I have found that this is an important feature and adds materially to the efficiency of the apparatus.

The liquid to be evaporated or concentrated is introduced into the lower pan B through a pipe M, its level being maintained at such a height as to permit a free circulation of the liquid. When steam is introduced into the drum C, the liquid in pan B will be caused to circulate as indicated by the arrows—that is to say, the heated liquid will rise in the vertical tubes E and flow over the top of the drum into the space at the end of the latter, where it cools sufficiently to maintain the circulation. The liquid, deprived of a portion of its water, is drawn off from pan B through a pipe N, and when necessary by means of a suitable force-pump, which is not shown in the drawings, and in like manner the heavier liquid is drawn from pan B' and delivered through pipe N' to pan B'', the proper level of liquid in the several pans being maintained by either a continuous or intermittent transfer of the liquid from one pan to another.

By the apparatus above described the process of evaporating or concentrating a liquid of any kind is very greatly facilitated and cheapened. It will be observed that by the plan proposed the latent heat of the vapors is utilized and that none of the applied heat is wasted.

Having now described my invention, what I claim is—

1. In an evaporating apparatus, the combination of a series of pans disposed one above the other, steam-drums, one for each pan, arranged in the liquid-spaces of the said pans, a steam connection with the first drum of the series, and vapor-passages H situated at the ends of the pans, and each opening at one end into a pan above the liquid-level therein, and at its other end opening into the steam-drum above the pan into which it opens, such passages being formed with trapped portions K, substantially as set forth.

2. In an evaporating apparatus, the combination of a series of pans disposed one above the other, steam-drums, one for each pan, arranged in the liquid-spaces of the said pans, a steam connection with the first pan of the series, and vapor connections with the other steam-drums, each vapor connection leading into the vapor-space of the pan below the drum with which it is connected, and the pipes N, each of such pipes leading from the bottom of one of the pans to the pan above and discharging thereinto near the steam-drum, substantially as set forth.

3. In an evaporating apparatus, the combination of a series of pans disposed one directly above the other, and having sloping bottoms, steam-drums, one for each pan, arranged in the liquid-spaces of the pans and extending partially across the same so as to leave free spaces beyond the ends of the drums for the free circulation of the liquid in the pans, a steam connection with the first pan of the series, vapor-passages H situated at the ends of the pans, each opening at one end into a pan above the liquid-level therein, and at its other end opening into the steam-drum above the pan into which it opens, such passages having trapped portions K, and the pipes N connecting the several pans, each of such pipes leading from the bottom of one of the pans into the pan above and discharging thereinto near the free space beyond the end of the steam-drum, substantially as set forth.

ROBERT HARVEY.

Witnesses:
  M. LAWSON DYER,
  PARKER W. PAGE.